United States Patent

[11] 3,590,958

| [72] | Inventor | Lloyd F. Elswick |
| | | 1543 Lime St., Clearwater, Fla. 33516 |
| [21] | Appl. No. | 831,002 |
| [22] | Filed | June 6, 1969 |
| [45] | Patented | July 6, 1971 |

[54] ADAPTER BLOCK FOR VEHICLE LIFTS
3 Claims, 4 Drawing Figs.

[52] U.S. Cl. .................................................. 187/8.74
[51] Int. Cl. .................................................. B66f 7/00
[50] Field of Search ....................................... 187/8.41,
8.43, 8.45, 8.54, 8.75, 8.74

[56] References Cited
UNITED STATES PATENTS

| 2,637,522 | 5/1953 | Wallace .......................... | 187/8.75 |
| 2,704,584 | 3/1955 | Tzschoppe ...................... | 187/8.75 |

*Primary Examiner*—Harvey C. Hornsby
*Attorneys*—Clarence A. O'Brien and Harvey B. Jacobson

ABSTRACT: A front-to-rear reversible spacing block for disposition in the center upwardly opening recess of the saddle atop a vehicle lift post. The lower portion of the block is contoured to snugly seat in the recess and the upper portion of the block includes downwardly facing surfaces for resting upon the upper surfaces of the saddle disposed about the recess. Further, the exposed upper portion of the block is stepped for adapting to forward center lift portions of various vehicles in reversed positions of the block.

PATENTED JUL 6 1971
3,590,958
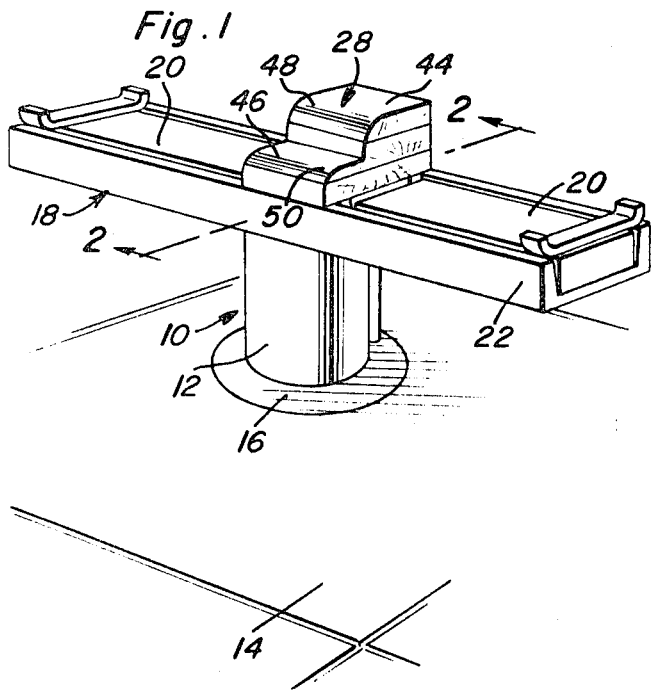
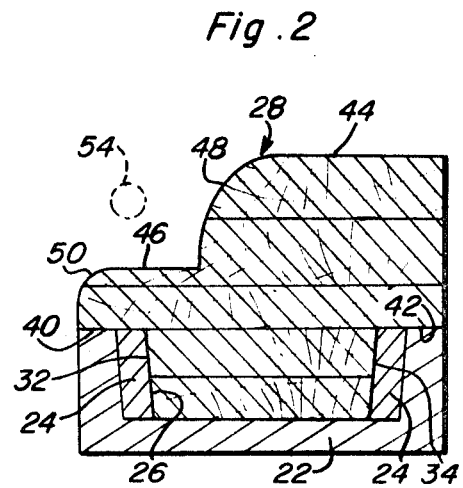
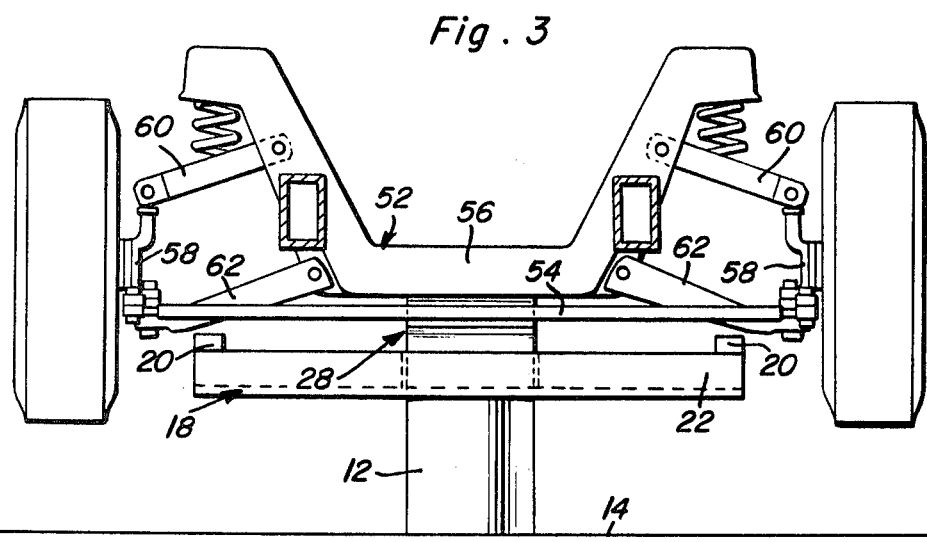
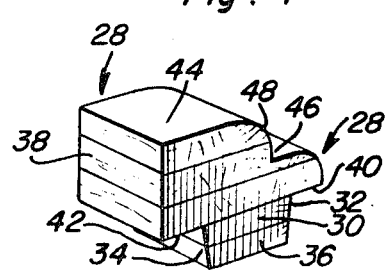
Lloyd F. Elswick
INVENTOR.
BY Clarence A. O'Brien
and Harvey B. Jacobson
Attorneys

ADAPTER BLOCK FOR VEHICLE LIFTS

Many state and county vehicle inspection stations utilize hydraulic post lifts whose piston portions are extendable upwardly from the floor of a service bay. These post lifts are provided with saddles on their upper ends and many of the saddles are in the form of crossheads whose remote ends are adapted to engage the undersurface portions of A-frames or other similar components of vehicle front wheel suspension systems. When a vehicle front end is provided with coil springs which bear down upon the upper surfaces of the lower A-frames, the aforementioned saddles function properly and may be utilized to lift the front end of the vehicle without interference with the tie rods, stabilizers, etc. Of course, when vehicles of this type have their front ends lifted in the this manner, the lower ball joints may not be fully unloaded. However, there is no way that the front end of such a vehicle may be lifted in a manner to fully unload the lower ball joints thereof.

On the other hand, some newer models of automobiles utilize torsion bar suspension and coil spring suspensions for the front wheels thereof that enable the front end of the vehicles to be lifted in a manner so as to fully unload the lower ball joints. These vehicles have the torsion bars or coil springs acting upon the upper control arms which are conventionally provided with means to limit their downward swinging movement and accordingly, the lower control arms may be fully unloaded if these vehicles are elevated from lift points which are fixed relative to the frame of the vehicle independent of the lower control arms. However, inasmuch as the aforementioned saddles extend to positions closely adjacent the inner surfaces of the front wheels of a vehicle and the outer ends of the lower control arms swing downwardly if the vehicle is lifted from a stationary frame portion, the outer ends of the lower control arms will contact the remote ends of the saddle as they swing downwardly before the downward limits of the upper control arms are reached. However, if a spacing block is used in the center of the saddle and the block includes an upper lift surface which is sufficiently elevated above the saddle, the spacing block may be utilized to lift a stationary crossmember portion of the frame in order that the outer ends of the lower control arms may swing downwardly to their limits without contacting the opposite ends of the crosshead.

It is accordingly the main object of this invention to provide a spacing or adapter block for vehicle lifts which may be utilized when lifting the front ends of vehicles whose springs or torsion bars act upon the upper control arms, whereby the lower ball joints of the vehicle will be unloaded and may be more readily checked for play.

Another object of this invention, in accordance with the immediately preceding object, is to provide an adapter block which is asymmetrically contoured and may be rotated 180° about a vertical axis so as to present differently contoured upper surfaces of the block in opposed relation to various components of vehicles for which clearance below the frame member of the vehicle must be provided when the front wheels of the vehicle are dropped relative to the frame as the frame is elevated.

A still further object of this invention is to provide an adapter block in accordance with the preceding objects and whose lower portion is specifically contoured to snugly seat within the center upwardly opening recess of a lift saddle when the block is disposed in either of its two 180° rotated positions.

A final object of this invention to be specifically enumerated herein is to provide an adapter block for vehicle lifts which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a conventional form of vehicle lift such as a Weaver lift Model EC-194 with the adapter block of the instant invention positioned in the center recess of the saddle of the lift;

FIG. 2 is an enlarged fragmentary vertical sectional view taken substantially upon the plane indicated by the section line 2-2 of FIG. 1;

FIG. 3 is a front elevational view of the assemblage illustrated in FIG. 1 and with the vehicle frame and front suspension components of an associated vehicle schematically illustrated in operative position as being supported from the block; and FIG. 4 is a perspective view of the block.

Referring now more specifically to the drawings the numeral 10 generally designates a post lift assembly including a piston portion 12 which is projectable upwardly from the upper surface 14 of a floor in which the cylinder portion 16 of the assembly 10 is recessed. The upper end of the piston portion 12 has a horizontally disposed saddle assembly referred to in general by the reference numeral 18 supported therefrom and the saddle assembly 18 includes opposite end adapters 20 which may be horizontally outwardly extended relative to the U-shaped body 22 of the saddle assembly 18.

The central portion of the body 22 is reinforced by means of reinforcing plates 24 secured within the body 22 in any convenient manner such as by welding. The adjacent ends of the adapters 20, when the latter are retracted as illustrated in FIG. 1 of the drawings, define therebetween a recess 26 within the U-shaped body 22 between the reinforcing plates 24.

The foregoing comprises a description of a conventional lift such as the Weaver lift Model EC-194.

The adapter block of the instant invention is referred to in general by the reference numeral 28 and includes a lower portion 30 which is contoured to be seatingly received in the recess 26. The lower portion includes slightly upwardly divergent front and rear walls 32 and 34 and substantially vertical opposite end walls 36. The block 28 further includes an upper portion 38 which is larger in plan area than the lower portion 30 and includes downwardly facing coplanar horizontal surfaces 40 and 42 projecting outwardly of the front and rear walls 32 and 34. In addition, the upper portion 38 is stepped so as to define upper and lower upper surface portions 44 and 46 joined by means of an arcuate convex generally cylindrical surface 48. Further, the forward portion of the upper surface portion 46 is rounded as at 50.

In operation, the block 28 may be seated in the recess 26 in the manner illustrated in FIGS. 1 and 2 of the drawings or in a similar manner but with the block 28 rotated 180° about a vertical axis. Accordingly, it may be seen that the upper surface portion 44 may be disposed either primarily forwardly of a vertical plane extending along the centerline of the body 22 or rearwardly of that vertical plane.

In FIG. 3 of the drawings the front end suspension of a conventional form of motor vehicle such as a Rambler is referred to in general by the reference numeral 52. The suspension system 52 includes a tie rod 54 which is disposed forwardly of a transverse frame member 56 of the Rambler. Accordingly, when the block 28 is utilized to elevate the front end of a Rambler, it is disposed within the body 22 in the positions illustrated in FIGS. 1 and 2 of the drawings whereby the tie rod 54 will be disposed above the lower upper surface portion 46 and clearance for the tie rod 54 will be provided when the spindles 56 are swung downwardly.

The block 28 is utilized when lifting the front ends of vehicles provided with coil springs or torsion bars acting upon the upper control arms 60 of the vehicle. By using the block 28, the transverse frame member 56 is elevated sufficiently above the saddle assembly 18 to enable the outer ends of the lower control arms 62 of the vehicle to be swung downwardly to the limit positions thereof defined by the lower limits of swinging movement of the upper control arms 60 without the outer ends of the lower control arms 62 contacting the opposite ends of the body 22. Otherwise, if the outer ends of the control arms 62 engaged the remote ends of the body 22 before the lower limits of swinging movement of the outer ends of the upper control arms 60 are reached, the lower ball joints of the suspension system 52 would not be unloaded.

When a vehicle other than a Rambler is lifted for checking the front suspension assembly thereof and the other vehicle is constructed so as to have its tie rod corresponding to tie rod 54 passing rearwardly of its transverse frame member corresponding to the transverse frame member 56, the block 28 is rotated 180° about a vertical axis so that the lower upper surface portion 46 will be disposed rearward of the transverse frame member of the other vehicle and clearance for the tie rod disposed rearward of that transverse frame member will be provided.

The block 28 may also be utilized to lift the front ends of foreign cars such as Volkswagens and when a Volkswagen is being lifted, the upper surface portion 44 is disposed beneath the front floor area of the Volkswagen in order that the lower ball joint of the Volkswagen may also be unloaded. Of course, when a vehicle that does not have coil springs or torsion bars acting upon its upper control arms is to be lifted, the block 28 may be removed and the front end of that vehicle may be lifted in the conventional manner directly from the saddle assembly 18.

Further, some vehicles include forward crankcase or pan portions disposed immediately to the rear of and which project slightly below the forward transverse frame member of the vehicle. When such vehicles are to be lifted by the adapter block, the notched side of the block faces rearwardly so as to provide clearance for the forward depending crankcase or pan portion of the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In combination, a vehicle post lift of the type including a vertically upwardly extendable post portion having a horizontal crosshead at its upper end, the opposite ends of said crosshead including front wheel suspension assembly support means, and an adapter spacing block for lifting central forward under portions of vehicles with said lift and with the front wheel suspension assemblies of said vehicle elevated above said opposite end wheel suspension assembly support means, said block and crosshead including coacting portions supporting said block from the central portion of said crosshead in general alignment with the upper end of said post portion and with said block including upper surface portions spaced above a horizontal plane containing said wheel suspension assembly support means, said upper surface portions including a pair of upwardly facing surfaces disposed in vertically spaced planes and on opposite sides of a vertical plane extending along the longitudinal centerline of said crosshead, said coacting portions including means for removably supporting said block on said crosshead for alternate positioning relative to the latter in positions rotated 180° relative to each other about a vertical axis generally aligned with the center axis of said post portion.

2. The combination of claim 1 wherein said coacting portions include means defining a center upwardly opening recess in said crosshead having upwardly facing surfaces of said crosshead disposed thereabout and a central depending portion of said block seatingly received in said recess and an upper portion which projects outwardly from all sides of said lower portion and includes downwardly facing surfaces abuttingly engageable with said crosshead upwardly facing surfaces when said lower portion is seated in said recess.

3. The combination of claim 1 wherein said recess includes upwardly convergent opposite sidewalls generally paralleling the longitudinal axis of said crosshead.